United States Patent
Levsen

(10) Patent No.: US 7,261,628 B2
(45) Date of Patent: Aug. 28, 2007

(54) DUAL OPERATION TRIPE WASHING AND REFINING MACHINE

(75) Inventor: Clark A. Levsen, Shawnee, KS (US)

(73) Assignee: Hantover, Inc., Kansas City, MO (US)

( * ) Notice: Subject to any disclaimer, the term of this patent is extended or adjusted under 35 U.S.C. 154(b) by 203 days.

(21) Appl. No.: 10/709,210

(22) Filed: Apr. 21, 2004

(65) Prior Publication Data

US 2005/0239387 A1    Oct. 27, 2005

(51) Int. Cl.
*A22C 17/16*    (2006.01)

(52) U.S. Cl. ........................ 452/123; 452/173

(58) Field of Classification Search ........... 452/106, 452/119, 123, 173

See application file for complete search history.

(56) References Cited

U.S. PATENT DOCUMENTS

| 989,072 | A | * | 4/1911 | Solomon ................... 452/12 |
| 1,475,929 | A | * | 12/1923 | Buckham ................. 452/123 |
| 1,578,167 | A | * | 3/1926 | Nagele ..................... 452/123 |
| 2,119,311 | A | * | 5/1938 | Biedermann ............. 452/123 |
| 2,213,453 | A | * | 9/1940 | Schmidt ................... 452/123 |
| 2,823,414 | A | * | 2/1958 | Seal et al. ................. 452/12 |
| 3,112,518 | A | * | 12/1963 | Doggett et al. ........... 452/123 |
| 3,846,869 | A | * | 11/1974 | Barbee ..................... 452/123 |
| 3,958,304 | A | * | 5/1976 | Barbee ..................... 452/123 |
| 4,293,980 | A | * | 10/1981 | Ward ....................... 452/123 |
| 4,376,325 | A | * | 3/1983 | Boas et al. ................. 452/93 |
| 4,710,999 | A | * | 12/1987 | Brunner et al. ............ 452/12 |
| 4,939,814 | A | * | 7/1990 | Tillion ..................... 452/13 |
| 6,083,096 | A | * | 7/2000 | Carrillo ................... 452/123 |
| 6,105,490 | A | * | 8/2000 | Horn et al. ............... 99/472 |
| 6,168,511 | B1 | * | 1/2001 | Amstrup ................... 452/173 |
| 6,315,654 | B1 | * | 11/2001 | Levsen .................... 452/123 |
| 6,508,699 | B1 | * | 1/2003 | Santoriello et al. ....... 452/99 |
| 6,578,468 | B1 | * | 6/2003 | Horn ....................... 99/334 |

(Continued)

FOREIGN PATENT DOCUMENTS

CH    597763    *    4/1978

(Continued)

OTHER PUBLICATIONS

Mecar Food Brochure entitled "Finishing Machines 'Mecar TML' Models: 0800-1200-2000-3000" (published prior to Apr. 21, 2003).

(Continued)

*Primary Examiner*—David Parsley
(74) *Attorney, Agent, or Firm*—Hovey Williams LLP

(57) ABSTRACT

A tripe washing and refining apparatus (10) includes a base (20), a vessel (14), and a motor (16). The vessel (14) includes a selectively reversible rotatable disc (30) and two baffles (32,34) extending from an annular side wall (24) above the disc (30). Disc projections (40,42,44) extend from an upper surface (38) of the disc (30) and present opposed washing (48) and refining (50) surfaces. The baffles (32,34) likewise present opposed washing (60) and refining (62) surfaces. The washing surfaces of the disc projections (40, 42,44) and the baffles (32,34) engage the tripe to agitate and wash it. The refining surfaces of the disc projections (40, 42,44) and the baffles (32,34) engage the tripe to remove fat or other components from its exterior.

3 Claims, 8 Drawing Sheets

U.S. PATENT DOCUMENTS 6,685,550 B2 * 2/2004 Houtz et al. ................ 452/123

FOREIGN PATENT DOCUMENTS

| CH | 604537 | * | 9/1978 |
| FR | 2601851 | * | 1/1988 |

OTHER PUBLICATIONS

Mecar Food Brochure entitled "Cleaning Machines 'Mecar DML' Models: 0800-1200-2000-3000" (published prior to Apr. 21, 2003).

La Parmentiere Brochure entitled "Two Speed Paunch Cleaning Machines Types: 470 P, 570 P, 670 P, and 880 P" (published prior to Apr. 21, 2003).

La Parmentiere Brochure entitled "REFINERS Types: 570 RD, 670 RD, 680 RD, and 880 RD " (published prior to Apr. 21, 2003).

ARY Incorporated Brochure for La Parmentiere Products entitled "La Parmentiere: a complete range of high efficient equipment for the meat industry" (published prior to Apr. 21, 2003).

* cited by examiner

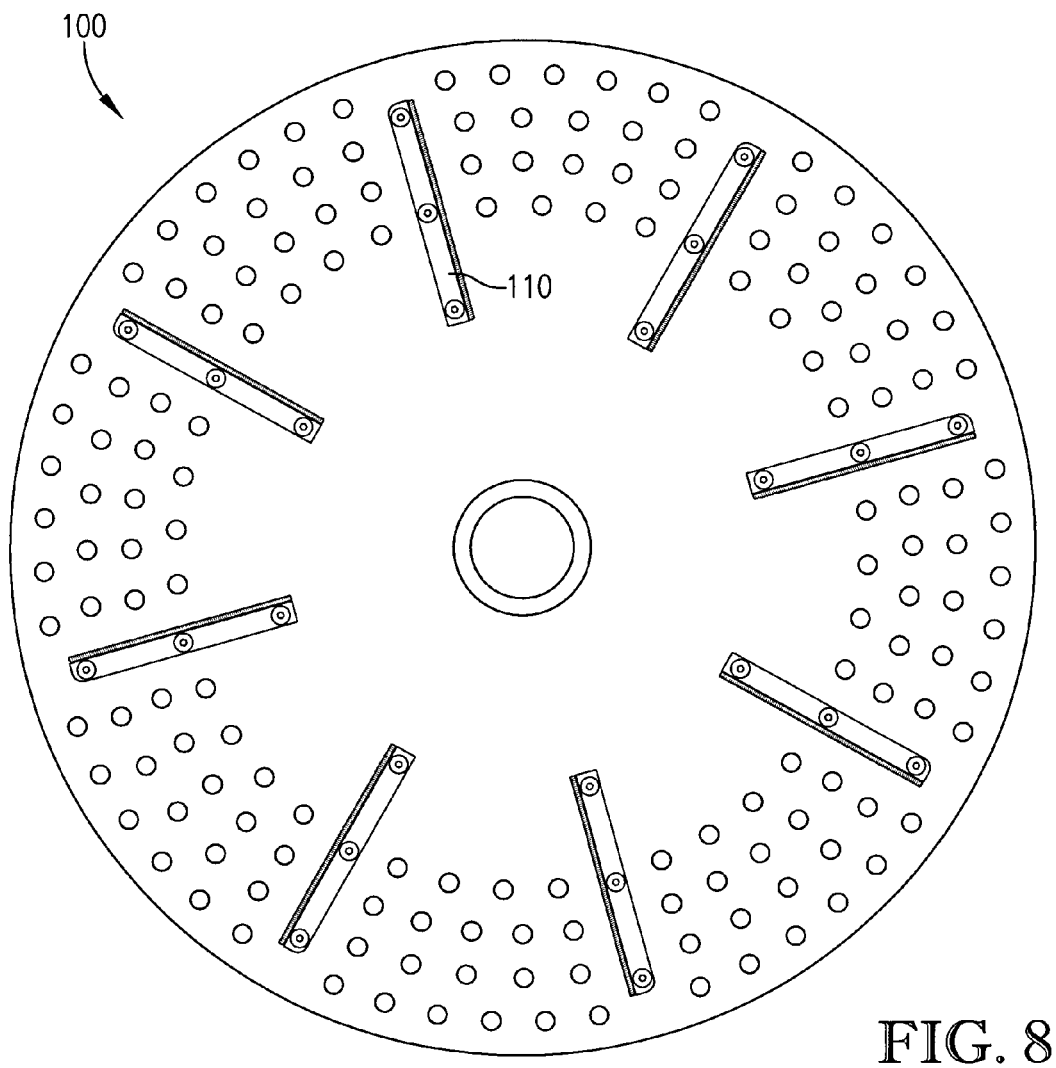
FIG. 8
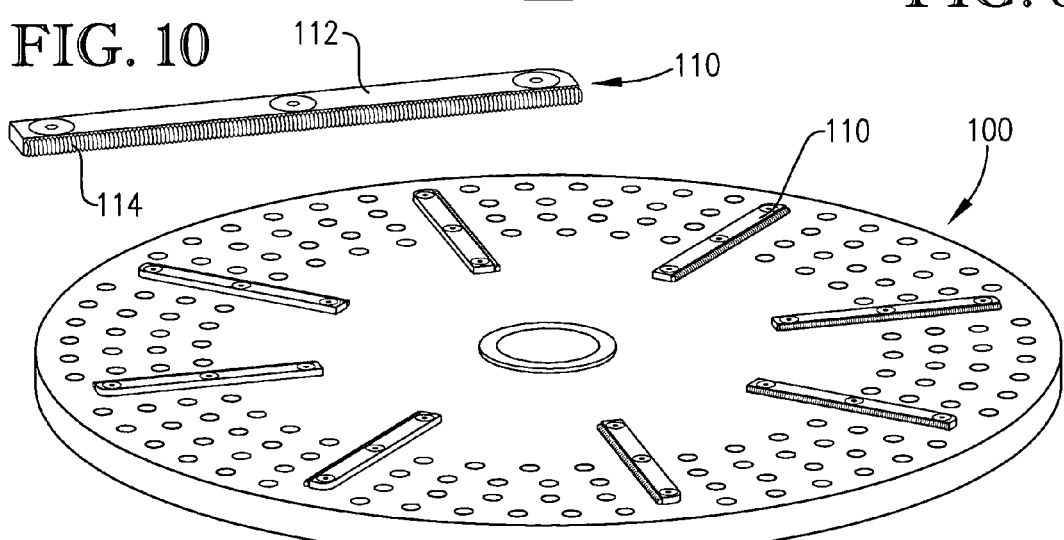
FIG. 10
FIG. 9

DUAL OPERATION TRIPE WASHING AND REFINING MACHINE

BACKGROUND OF INVENTION

1. Field of the Invention

The present invention relates to an apparatus for cleaning tripe. More particularly, the present invention relates to a single apparatus that performs tripe washing and refining operations.

2. Description of Prior Art

Stomachs of ruminant animals, such as cattle, sheep and goats, are commonly processed for human consumption. Ruminant animals have multiple stomachs, including the rumen or "paunch," which is the first stomach; the omasum or "bible," which is the third stomach; and the abomasum, which is the fourth stomach. The various stomachs are often collectively referred to as "tripe." Tripe can be consumed by humans and is considered by some to be a delicacy. However, tripe must be adequately processed prior to human consumption.

Tripe processing typically includes a washing phase and a refining phase. In the washing phase, the interior of the stomach is cleansed of residual contents and other impurities. Washing is typically performed by agitating the tripe to dislodge the impurities and rinsing the tripe with water. A tripe washing apparatus known in the art includes a chamber with a rotatable disc located at the bottom of the chamber. The apparatus agitates the tripe by spinning the disc, which throws the tripe against the walls of the chamber. The walls of the chamber are shaped to deflect the tripe back toward the rotating disc. The apparatus also has means to introduce water into the chamber and to drain the water, so that the tripe may be rinsed as it is agitated and the impurities removed from the chamber.

In the refining phase, fat is removed from the exterior of the stomach. Refining is typically performed after washing and involves scarifying the tripe to cut and scrape the fat from the tripe. A tripe refining apparatus known in the art includes a chamber and a rotatable disc located at the bottom of the chamber, wherein an upper surface of the disc and an inner surface of the chamber are gritted. The apparatus scarifies the tripe by rotating the disc, which scrapes the tripe against the gritted surface of the disc and throws the tripe against the gritted surface of the chamber. The gritted surface of the chamber is shaped to deflect the tripe back toward the rotating disc. The refining apparatus further has means of introducing a refining liquid, such as a water/chemical mixture, into the chamber during the refining process.

These prior art tripe washing apparatuses and prior art tripe refining apparatuses are problematic and subject to several undesirable limitations. For example, the tripe must be removed from the washing apparatus and loaded into the refining apparatus. Tripe can weigh as much as thirty-five pounds per piece and present a slick outer surface, making it difficult to handle, and it is desirable to include as many as twenty tripe in a single cycle. The loading and unloading process, therefore, can require a significant amount of manual labor. Another problem presented by the prior art apparatuses is that each apparatus can cost as much as $50,000, making the cost of a implementing a tripe washing and refining process prohibitively expensive.

Thus, there exists a need in the art for an improved cleaning and refining process that is less labor intensive and more cost-effective.

SUMMARY OF INVENTION

The present invention provides an improved apparatus for washing and refining tripe that does not suffer from the problems and limitations of the prior art described above. Particularly, the present invention provides a single apparatus for performing tripe washing and tripe refining operations by employing a rotatable disc that causes the tripe to be washed when rotated in a first direction and causes the tripe to be scarified when rotated in a second direction. The improved apparatus enables tripe to be loaded into a single machine, washed and then scarified without the need for a labor-intensive intermediary loading and unloading step.

In one aspect, the invention features a tripe cleaning apparatus adapted to wash and refine a quantity of tripe. The apparatus comprises a vessel defining an inner chamber for retaining the tripe, and a rotatable member housed within the chamber and adapted to rotate in a first direction and in a second direction. Rotating the member in the first direction causes the tripe to be washed and rotating in the second direction causes the tripe to be scarified.

In another aspect, the invention features a tripe cleaning apparatus adapted to wash and refine a quantity of tripe. The apparatus comprises a vessel with a wall defining an inner chamber, wherein the chamber is adapted to contain the quantity of tripe. The apparatus further comprises a disc housed within the chamber and rotatable in a first direction and in a second direction, the disc including an upper surface and a plurality of disc projections projecting from the upper surface of the disc, each of the disc projections presenting opposed washing and refining surfaces. The washing surfaces are substantially smooth and the refining surfaces are abrasive. Finally, the apparatus includes a motor connected to the disc for selectively rotating the disc in the first and second directions.

In another aspect, the invention features a tripe cleaning apparatus adapted to wash and refine a quantity of tripe. The apparatus comprises a vessel with a wall defining an inner chamber, wherein the chamber is adapted to contain the quantity of tripe and the vessel includes a washing water inlet pipe nozzle, a refining water inlet pipe nozzle, and a cold water inlet pipe nozzle, wherein each nozzle is adapted to connect the chamber with an external water source. The apparatus further comprises a circular disc housed within the chamber and rotatable in a clockwise direction and in a counter-clockwise direction, the disc including an upper surface and a plurality of disc projections projecting from the upper surface wherein each of the disc projections presents a radially oriented longitudinal axis, a substantially smooth washing surface, and a gritted refining surface. The washing surface slopes upward from the upper surface of the disc to the axis along the clockwise direction, the gritted refining surface is longitudinally opposite the washing surface and sloping upward from the upper surface of the disc to the axis along the counter-clockwise direction.

The apparatus further comprises a motor connected to the disc for selectively rotating the disc in the clockwise direction and in the counter-clockwise direction and a switch connected to the motor and switchable between a first position, wherein the motor rotates the disc in the clockwise direction, and a second position, wherein the motor rotates the disc in the counter-clockwise direction. The apparatus further comprises a plurality of baffles coupled to the wall of the vessel, spaced above the disc, and radially protruding inwardly from the wall. Each of the baffles includes a substantially smooth concave washing surface sloping away from the inner wall along the counter-clockwise direction, and a gritted concave refining surface longitudinally opposite the washing surface sloping away from the wall along the clockwise direction.

In another aspect, the invention features a method of washing and refining tripe. The method comprises the steps of placing the tripe on a rotatable member, rotating the member in a first direction to wash the tripe, and rotating the member in a second direction to scarify the tripe.

Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein:

FIG. 8 is a sectional fragmented view of a tripe washing and refining apparatus constructed in accordance with a preferred alternate embodiment;

FIG. 9 is an enlarged fragmented view of the tripe washing and refining apparatus illustrated in FIG. 8 and showing a baffle of the vessel;

FIG. 10 is a plan view of the rotatable disc removed from the vessel of the tripe washing and refining apparatus illustrated in FIGS. 8–9;

DETAILED DESCRIPTION

Figure 1:
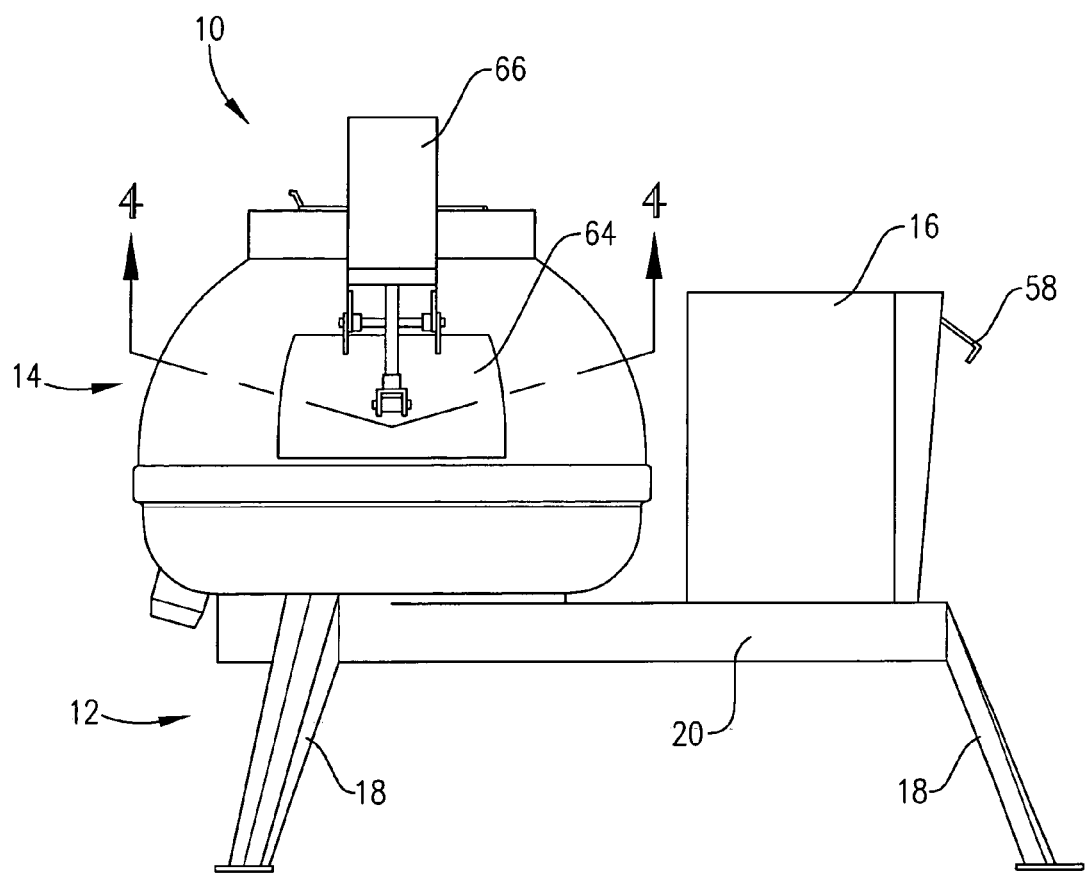
FIG. 1 is a side elevation view of a tripe washing and refining apparatus constructed in accordance with a preferred embodiment of the present invention.

Turning initially to FIG. 1, an apparatus 10 for washing and refining tripe is shown constructed in accordance with a preferred embodiment of the present invention. The apparatus 10 eliminates the need for separate washing and refining apparatuses by enabling a wash cycle and a refine cycle to be sequentially performed by a single machine without compromising the quality of the washing and the refining operations. In the wash cycle, the tripe is washed of residual contents and other impurities. In the refine cycle, the tripe is stripped of fat or other components. As described below, in the illustrated apparatus 10 the sequential dual cycles are enabled by opposing washing and refining surfaces that cooperate with a selectively reversible rotatable disc. Moreover, the apparatus could be variously configured so long as it enables dual cycles. The illustrated apparatus 10 broadly includes a base 12, a vessel 14, and a motor 16.

Figure 2:
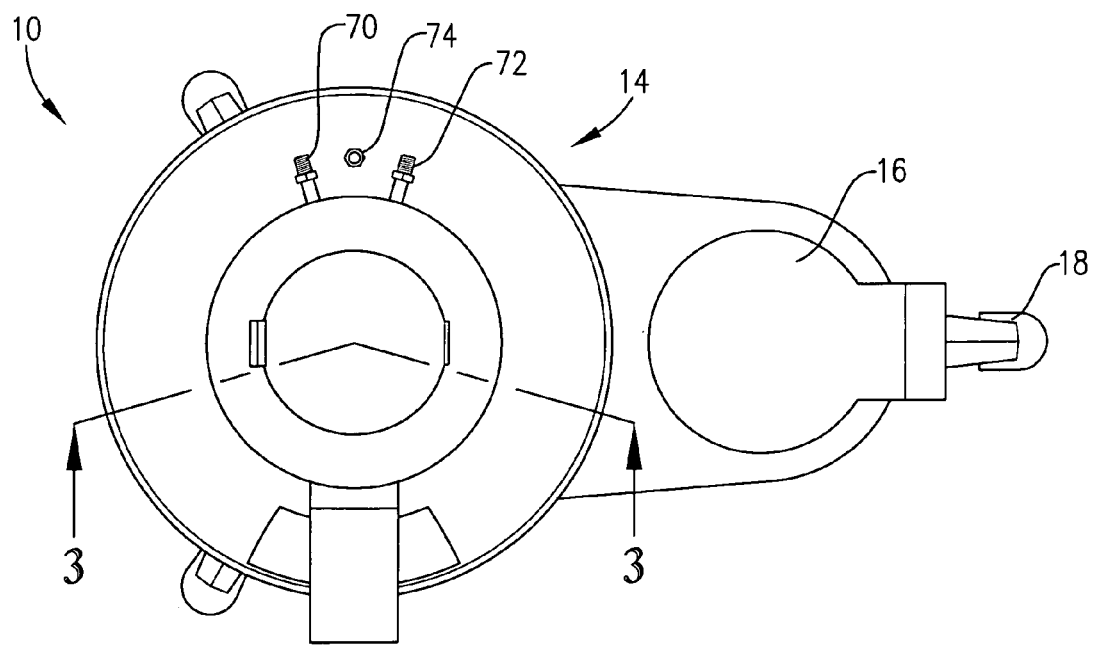
FIG. 2 is a plan view of the tripe washing and refining apparatus illustrated in FIG. 1.

The base generally elevates and supports the other components of the apparatus. The illustrated base 12 includes legs 18 and a platform 20. In more detail, and as shown in FIGS. 1–2, the legs 18 elevate and support the platform 20. The platform 20 is strong enough to support the weight of the vessel 14, which may include several hundred pounds of tripe and fluids, and the industrial-sized motor 16 and related controls. The legs 18 preferably elevate the platform 20 to a height that facilitates use and maintenance of the vessel 14, such as loading and unloading tripe and cleaning internal components of the vessel 14. As explained above, the weight of each piece of tripe can be as much as thirty-five pounds, which may render loading and unloading the vessel 14 very difficult if the platform 20 is not maintained at a level where a user can easily reach inside the vessel 14 and lift the tripe. Furthermore, elevating the vessel 14 above ground level is also desirable to facilitate drainage of washing and refining fluids. It will be appreciated that the base could be variously configured, for example, to include any number of legs 18, and the height of the platform 20 may vary according to the needs of the user.

Figure 3:
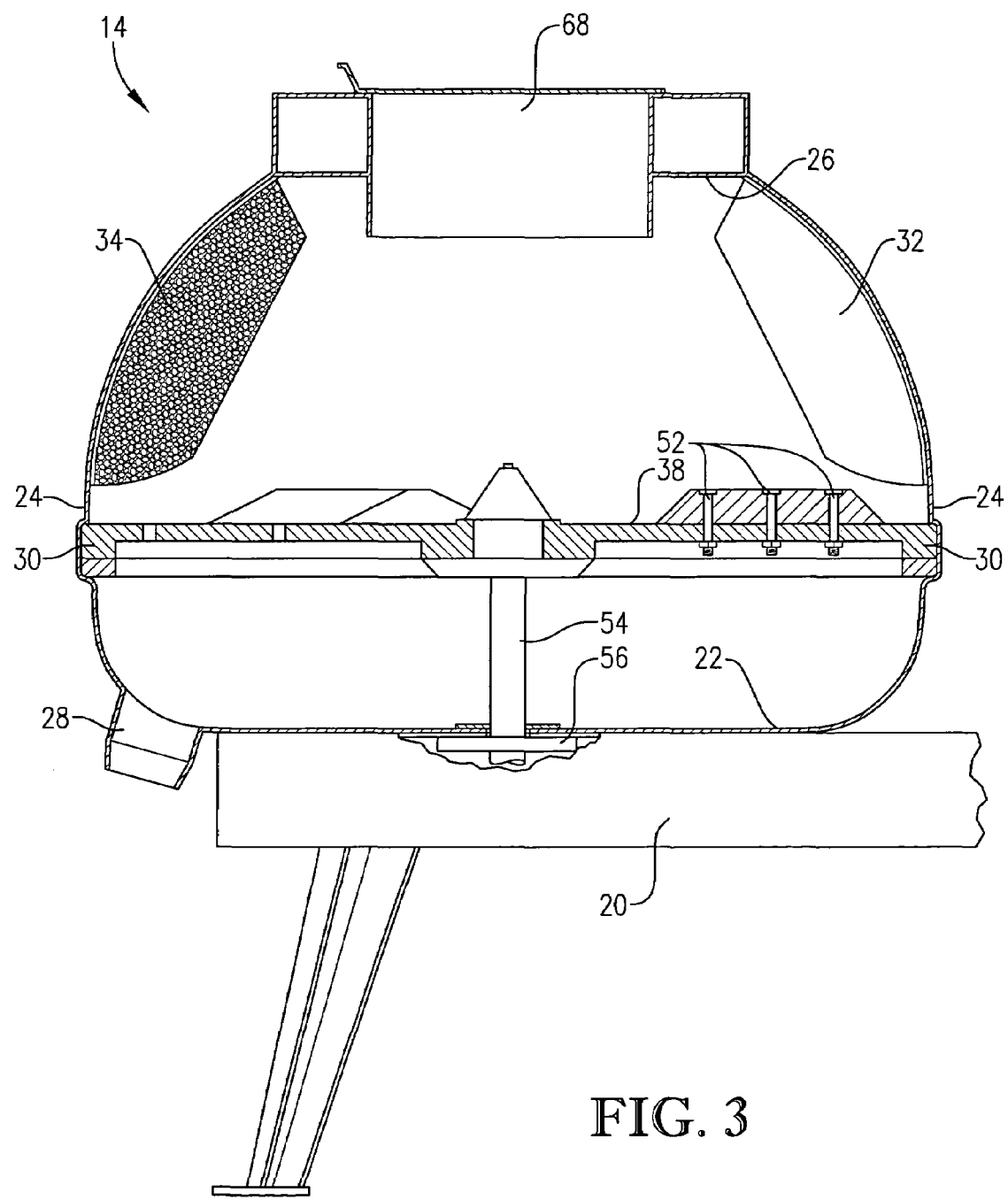
FIG. 3 is an enlarged sectional view of the tripe washing and refining apparatus taken generally along line 3—3 of FIG. 2 and illustrating internal components of the vessel.

Turning now to FIG. 3, the vessel 14 of the washing and refining apparatus 10 is shown. The vessel generally contains the opposing washing and refining surfaces and the selectively reversible rotatable disc that enable the sequential washing and refining cycles. In more detail, the illustrated vessel 14 defines an inner chamber with a bottom wall 22 and an annular side wall 24 that extends upward from the bottom wall 22 to a top wall 26. The bottom wall 22 rests on the platform 20, and in use receives and retains washing fluids and refining fluids as well as impurities and components removed from the tripe, as discussed below in greater detail. A drain 28 drains the washing and refining fluids and is integral with the bottom wall 22. The drain 28 is shown near the side wall 24 of the vessel 14 and depending from a portion of the bottom wall 22 that extends beyond the platform 20 to facilitate use of drain 28 by, for example, attaching a drain hose or pipe to the drain 28 or positioning the drain 28 over a floor drain or other conduit. The drain 28 may be placed in other positions, however, as the need arises. The drain 28 is preferably closed during operation, and may employ any of various means known in the art to regulate the flow of fluids, such as a valve or threaded cap.

Figure 6:
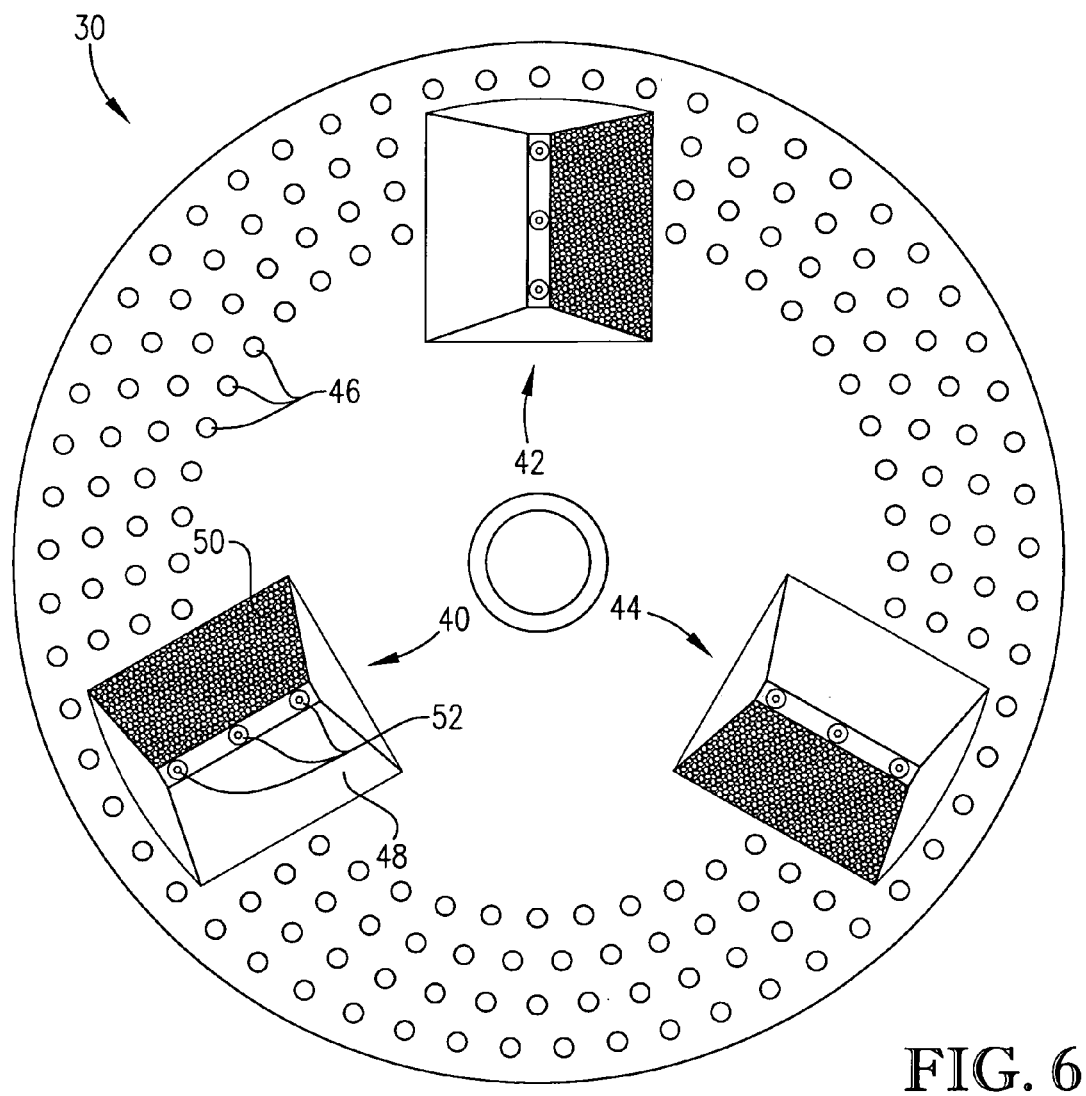
FIG. 6 is a plan view of the rotatable disc removed from the vessel of the tripe washing and refining apparatus illustrated in FIGS. 1–5.
Figure 7:
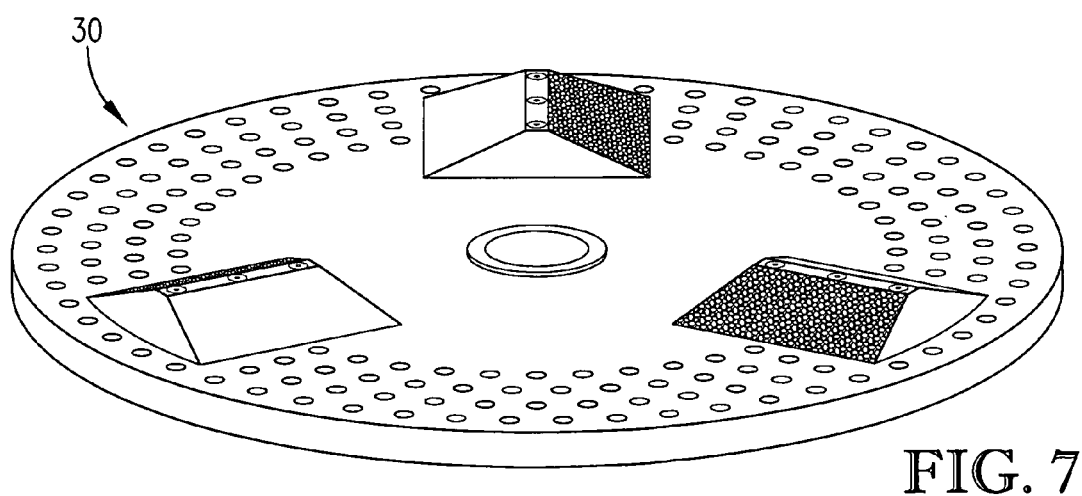
FIG. 7 is a perspective view of the disc illustrated in FIG. 6.
Figure 11:
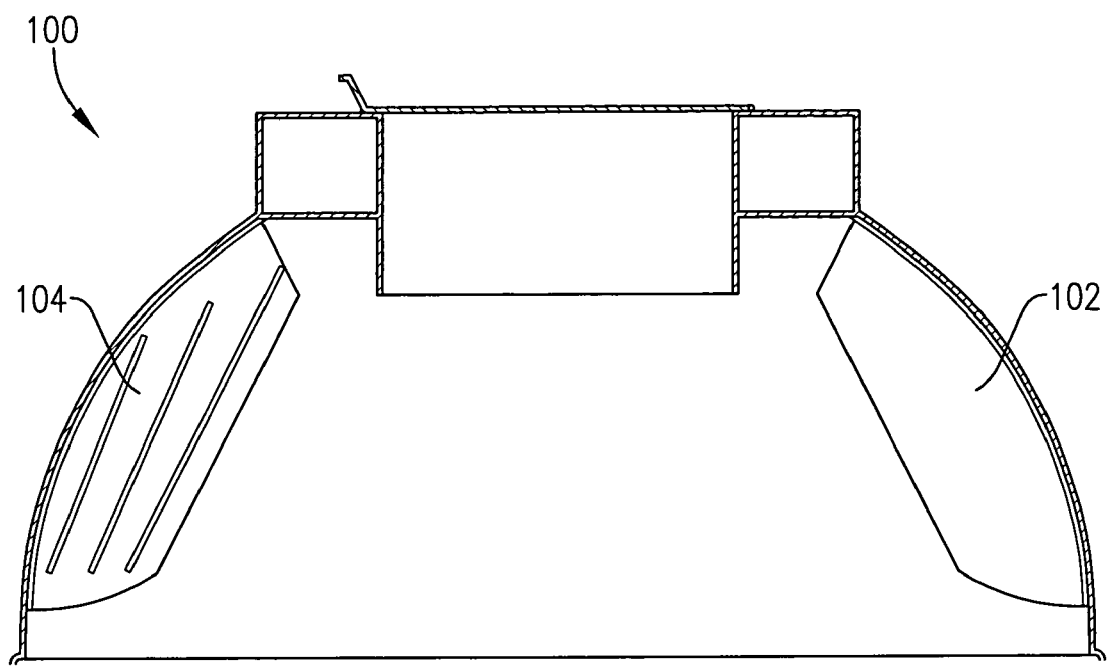
FIG. 11 is a perspective view of the disc illustrated in FIG. 10.
Figure 12:
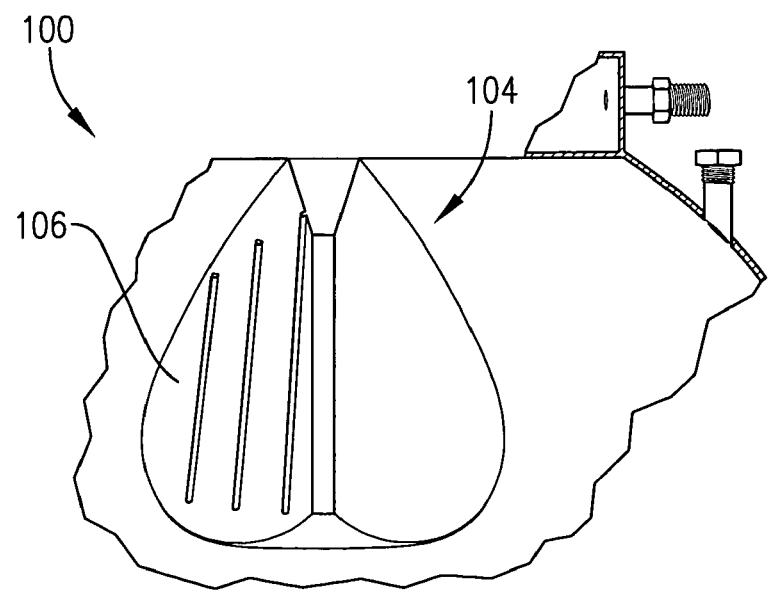
FIG. 12 is a perspective view of a disc projection of the rotatable disc illustrated in FIGS. 10–11.

As indicated above, in the illustrated embodiment sequential dual cycles are enabled by opposing washing and refining surfaces that cooperate with a selectively reversible rotatable disc. In more detail, and as shown in FIG. 3, a rotatable disc 30 and baffles 32,34 are contained within the vessel 14 and present the washing and refining surfaces. Generally, the disc and the baffles cooperate so that rotating the disc in a first direction causes the tripe to be washed and not scarified, and rotating the disc in a second direction causes the tripe to be scarified. The illustrated rotatable disc 30, as shown in FIGS. 6 and 7, includes an upper surface 38 and a plurality of disc projections 40,42,44 extending upwardly from the upper surface 38. The rotatable disc 30 further includes an array of drain holes 46 for allowing drainage of the washing and refining fluids from the disc 30 to the bottom wall 22 of the vessel 14. The drain holes 46 are preferably approximately one inch in diameter and extend from the upper surface 38 through the disc 30. The drain holes 46 are preferably arranged in concentric circles as illustrated, but may be arranged in other patterns for utility or aesthetic purposes. Furthermore, the drain holes 46 may be of various sizes and shapes.

Each of the disc projections 40,42,44 are virtually identically configured, therefore only projection 40 will be described in detail with the understanding that projections 42 and 44 are similarly constructed. Generally, the disc projections engage the tripe to wash it when the disc is rotated in a first direction, and engage the tripe to refine it when the disc is rotated in a second direction. The illustrated disc projection 40 preferably includes two sides, wherein a first side presents a planar washing surface 48 and a second side presents a planar refining surface 50 opposing the washing surface. The washing surface 48 engages the tripe during the washing process and the refining surface 50 engages the tripe during the refining process, as described in greater detail below. The washing surface 48 slopes upward from the upper surface 38 of the disc 30 along the clockwise direction toward a longitudinal axis of the projection 40. The refining surface 50 slopes upward from the upper surface 38 of the disc 30 along the counterclockwise direction toward the longitudinal axis of the projection 40. The washing surface 48 is substantially smooth to agitate the tripe without scarifying it, while the refining surface 50 is substantially abrasive to agitate and scarify the tripe. The refining surface 50 is preferably gritted, buy may be any surface sufficiently abrasive to scarify the tripe, such as a serrated or knurled surface.

During the wash and refine cycles, the disc projection 40 endures substantial contact with the tripe and thus is susceptible to wear and tear that may cause, for example, the refining surface 50 to become less abrasive with use. Therefore, it may be preferable to replace the disc projections 40,42,44 periodically to maintain the efficiency of the apparatus 10. It may also be preferable to replace the disc projections 40,42,44 with projections of different size, shape or coarseness adapted for different tasks. To facilitate replacement, the disc projections 40,42,44 are preferably removably secured to the disc 30 with fasteners 52. Fasteners 52 preferably comprise a nut and bolt combination, as shown in FIG. 3, but may include any fastener strong enough to secure the disc projections 40,42,44 to the disc 30 during use. While the preferred embodiment includes three disc projections 40,42,44 radially evenly spaced from a center of the disc 30 and separated by arcs of approximately equal length, any number of projections of various size, shape, and placement may be used.

The motor 16 is drivingly connected to the disc 30 and is configured to selectively rotate the disc 30 in the clockwise direction and the counterclockwise direction. As illustrated in FIG. 3, a shaft 54 fixed to the disc 30 extends through the bottom wall 22 of the vessel 14 and connects to a driven pulley 56. In a manner known in the art, the pulley 56 is entrained by a belt or chain that entrains a drive pulley (not shown) in communication with the motor 16. The motor 16 selectively drives the disc 30 in one of the two directions, as determined by a switch 58. In the preferred embodiment, the switch 58 is electronic and presents a user input for allowing a user to select, for example, the wash cycle only, the refine cycle only, or the wash and refine cycles in a sequentially automated process. By pressing a "start" button on the switch 58, for example, the user may initiate a process that automatically runs the wash cycle and then the refine cycle. The switch 58 may further present user inputs that allow the user to control fluid flow, fluid temperature, disc spin rate, etc.

Figure 4:
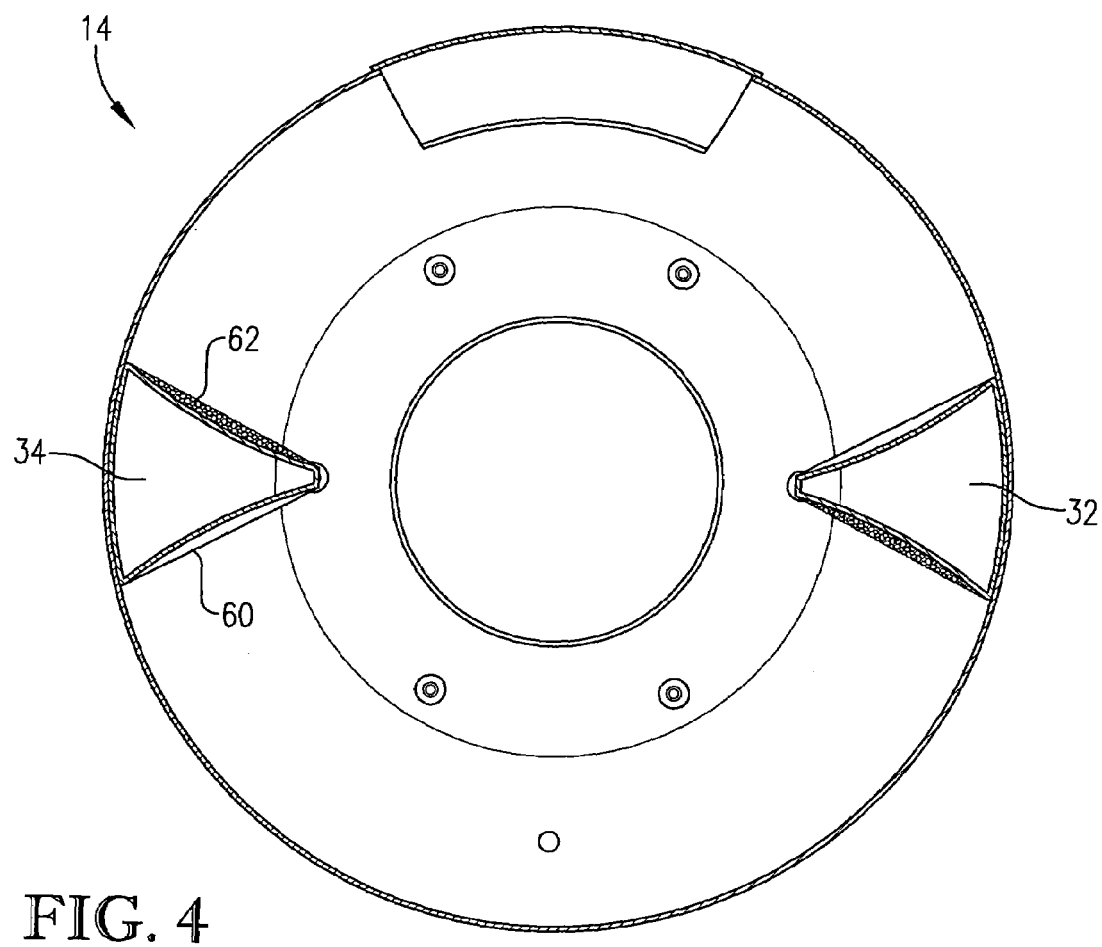
FIG. 4 is an enlarged sectional view of the tripe washing and refining apparatus taken generally along line 4—4 of FIG. 1.
Figure 5:
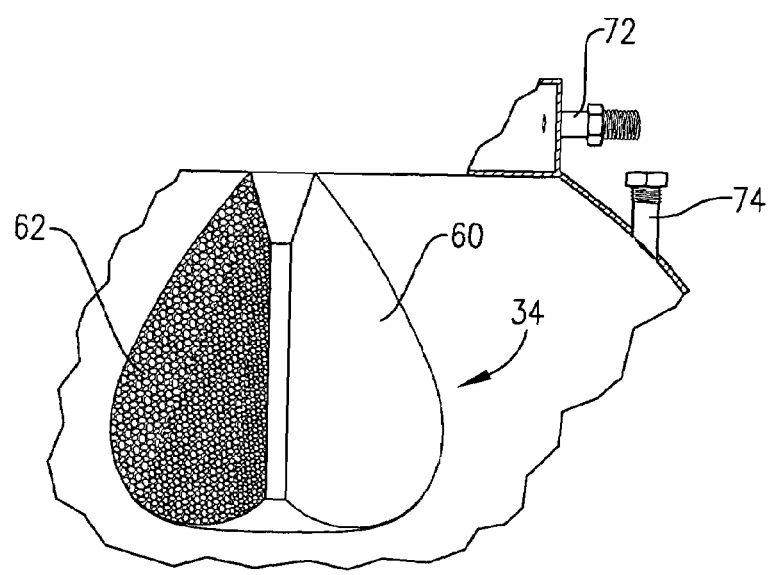
FIG. 5 is an enlarged fragmented view of the tripe washing and refining apparatus illustrated in FIGS. 1–4 and showing a baffle of the vessel.

The vessel 14 contains baffles 32,34 that cooperate with the disc projections 40,42,44 to wash and refine the tripe. Each of the baffles 32,34 are virtually identically configured, therefore only baffle 32 will be described in detail with the understanding that baffle 34 is similarly constructed. Generally, the baffles engage the tripe to wash it when the tripe is rotated in a first direction, and engage the tripe to refine it when the tripe is rotated in a second direction. The illustrated baffle 34 protrudes radially within the inner chamber from an inner surface of the side wall 24, as best depicted in FIGS. 3–5. The baffle 32 includes two sides, wherein a first side presents a concave washing surface 60 and a second side presents a concave refining surface 62 opposing the washing surface 60. The washing surface 60 slopes inward from the side wall 24 along the counterclockwise direction toward a longitudinal axis of the baffle 32. The refining surface 62 slopes inward from the side wall 24 along the clockwise direction toward the longitudinal axis of the baffle 32. In the preferred embodiment, the baffle washing surface 60 is substantially smooth to agitate the tripe without scarifying it, while the refining baffle surface 62 is substantially abrasive to agitate and scarify the tripe. The refining baffle surface 62 is preferably gritted, but may be knurled, serrated, or otherwise abrasive in a manner that scarifies the tripe as the baffle 32 engages the tripe.

In addition to agitating and refining the tripe, the baffle 32 deflects the tripe toward a center of the disc 30 as the tripe is deflected against the side wall 24 by the disc projections 40,42,44, as discussed below in greater detail. The baffle 32 is preferably fixedly attached to the side wall 24 buy may be removably attached to facilitate replacement if, for example, the refining surface 62 of the baffle 32 degrades with use from wear and tear. Furthermore, the preferred embodiment includes two baffles 32,34 located on the side wall 24 at approximately 180 degree intervals, but it will be appreciated that any number of baffles may be used and may be placed in various positions.

The side wall 24 includes a side door 64 and a side door actuator 66. The side door 64 is large enough to allow the tripe to be easily loaded into and removed from the vessel 14. To prevent the door 64 from impeding the loading and unloading processes, the door 64 is hingedly attached to the side wall 24 along a top edge of the door 64 so that the door 64 pivots upward from a closed position (shown in FIG. 1) to an open position. The door 64 must be strong enough to contain the tripe and washing and refining fluids during the washing and to prevent leaking.

The side door actuator 66 serves to selectively secure the door 64 in the closed position or in the open position. The actuator 66 is preferably electric or hydraulic to automatically move the door 64 between the open and closed positions controllable with a user-operated switch or automatically at the end of a cycle or process. Alternatively, the actuator 66 may be manually controlled and require a user to, for example, shift a lever to move the side door 64 between the open and the closed positions.

The top wall 26 includes a top access door 68 to allow a user to access the inner chamber of the vessel 14 for routine maintenance, repair, etc. Entrance through the access door 68 would facilitate, for example, cleaning of the baffles 32,34 and would provide a point of access for maintenance work, such as replacing or cleaning the disc projections 40,42,44. The top wall 26 further includes a washing fluid inlet nozzle 70, a refining fluid inlet nozzle 72, and a cold water inlet nozzle 74. Each nozzle may be connected to a separate external fluid source such as, for example, a water pipe or chemical dispenser. The illustrated apparatus 10 preferably enables wash and refine cycles that include the use of washing and refining chemicals. However, cycles that include the use of water only are also contemplated by the present invention.

In use, a user opens the side door 64 and places a quantity of tripe to be washed and refined on the disc 30 in the vessel 14. After closing the side door 64, the user activates the apparatus 10 by activating the motor 16 with switch 58, as explained above, to initiate a process that includes both a wash cycle and a refine cycle. Alternatively, it may be preferable to run a single wash or refine cycle.

The washing and refining process begins as the tripe is rinsed with cold water from the cold water inlet nozzle 74. This initial rinse step removes loose debris from the tripe in preparation for the more rigorous wash cycle and therefore may be necessary only with tripe that includes a substantial amount of external loose debris. The cold water washes the debris through the drain holes 46 of the disc 30 to the bottom wall 22 so that the debris may be removed from the apparatus 10 via the drain 28.

The wash cycle removes residual contents of the tripe and other impurities. The wash cycle begins as a cleaning fluid is introduced into the vessel 14 via the washing fluid inlet nozzle 70 and the disc 30 is driven in the counter-clockwise direction by the motor 16. The washing fluid is preferably water between sixty-two and seventy-eight degrees Celsius that includes washing chemicals, such as detergents, to aid in washing the tripe. As the disc 30 and tripe are rotated, centrifugal forces urge the tripe toward the side wall 24. Tripe that reaches the side wall 24 collides with the washing surface 60 of the baffles 32. When the disc 30 rotates at higher speeds, the tripe slides or rolls along the disc 30 until it encounters the washing surface 48 of the disc projections 40,42,44. The disc projections 40,42,44 collide with the tripe and deflect it upward. When the tripe is deflected upward it engages the washing surface 60 of the baffles 32,34, which slows the tripe and deflects it toward the center of the disc 30. During the washing cycle, then, the tripe repeatedly collides with the disc projections 40,42,44, is deflected upward, collides with the baffles 32,34 and is deflected back toward the disc 30. These collisions agitate the tripe to remove impurities, and the washing fluid washes the impurities through the drain holes 48 of the disc 30 and out of the vessel 14 via the drain 28.

It will be appreciated that as the tripe flows through the wash cycle, substantial contact with the disc projections 40,42,44 and the baffles 32,34 is limited to the washing surfaces 48,60 as opposed to the refining surfaces 50,62. Thus, the wash cycle acts only to clean the tripe by removing residual contents and other impurities and does not remove components of the tripe, such as fat. After the wash cycle the motor 16 stops driving the disc 30, the supply of washing fluid is cut off, and the fluid in the vessel 14 is allowed to drain.

It will further be appreciated that the tripe does not need to be removed after the wash cycle and in preparation for the refine cycle, thus eliminating that labor-intensive and time consuming step. The refine cycle removes fat or other components of the tripe that are undesirable for human consumption. The apparatus 10 begins the refine cycle by introducing refining fluid into the vessel 14 through the refining fluid inlet nozzle 72 and driving the disc 30 in the clockwise direction. The refining fluid is preferably water at a temperature between eighty and ninety-five degrees Celsius that includes refining chemicals, such as hydrogen peroxide, to aid in removing the fat or other components from the tripe.

During the refine cycle the tripe interacts with the disc 30 and the baffles 32,34 in a manner similar to that of the washing cycle, except that the tripe contacts the refining surfaces 50,62 of the disc projections 40,42,44 and the baffles 32,34. The tripe collides with the refining surfaces 50 of the disc projections 40,42,44 which deflect the tripe upward. The tripe then collides with the refining surfaces 62 of the baffles 32,34, which slows the tripe and deflects it toward the disc 30. The abrasive refining surfaces scarify the tripe to remove the fat or other components from an external surface of the tripe. The refining fluid washes the fat from the vessel 14 as it is removed from the tripe.

Upon completion of the refine cycle the motor stops driving the disc 30 and the refining fluid is allowed to drain from the vessel 14. The tripe may then be removed from the vessel 14, or, alternatively, the tripe may be cooled or rinsed by flushing it with cold water from the cold water inlet nozzle 74 prior to removal from the vessel 14.

Figure 13:
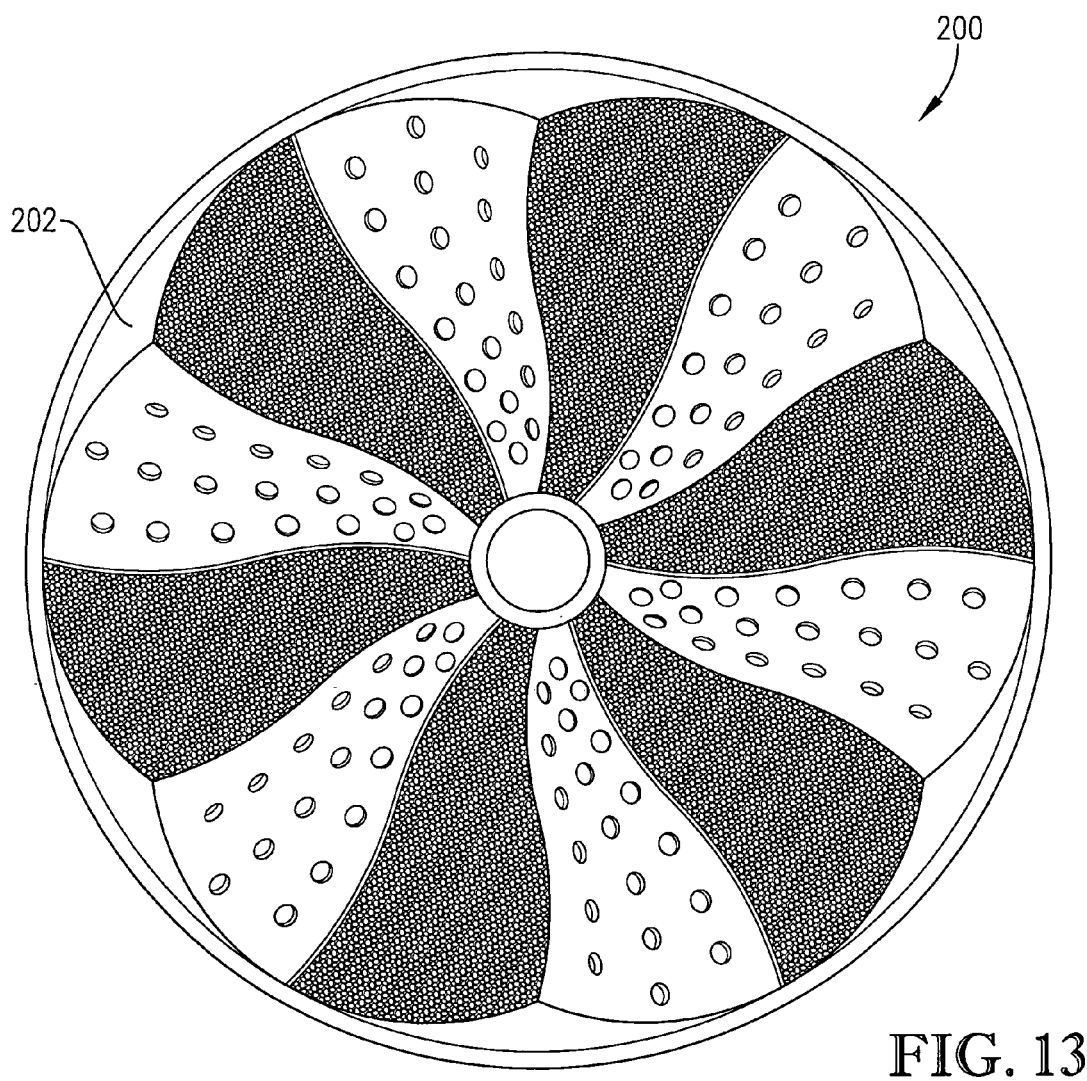
FIG. 13 is a plan view of the rotatable disc removed from the vessel of a tripe washing and refining apparatus constructed in accordance with a second preferred alternate embodiment.
Figure 14:
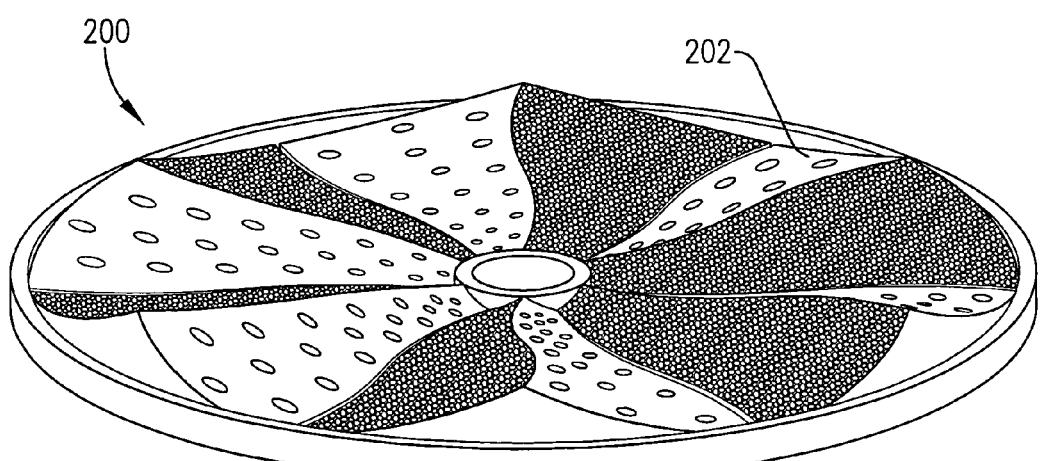
FIG. 14 is a perspective view of the disc illustrated in FIG. 13.

As indicated above, the present invention could be configured according to alternate embodiments. One such preferred alternate embodiment is the apparatus 100 illustrated in FIGS. 8–12. The apparatus 100 is similar in many respects to the apparatus 10 previously described in detail. However, the apparatus 100 includes baffles 102,104 that present refining surfaces 106,108 that are not gritted but have ridges that run approximately parallel with the axes of the baffles 102,104. Furthermore, the apparatus 100 includes a plurality of disc projections, exemplified by disc projection 110, that include rectangular rods. Each rod presents a washing surface 112 and a refining surface 114. The washing surface 112 is substantially smooth while the refining surface 114 is substantially abrasive. The illustrated refining surface 114 includes a threaded shaft, known in the art as "all thread." Another preferred alternative embodiment is the apparatus 200 illustrated in FIGS. 13–14. The apparatus 200 is similar in many respects to the apparatus 10 previously described in detail. However, the apparatus 200 includes a plurality of disc projections, exemplified by disc projection 202, that are substantially larger than the disc projections 40,42,44 of the apparatus 10. Curvilinear, undulated surfaces further distinguishes the disc projection 202 from the disc projections 40,42,44.

Figure 15:
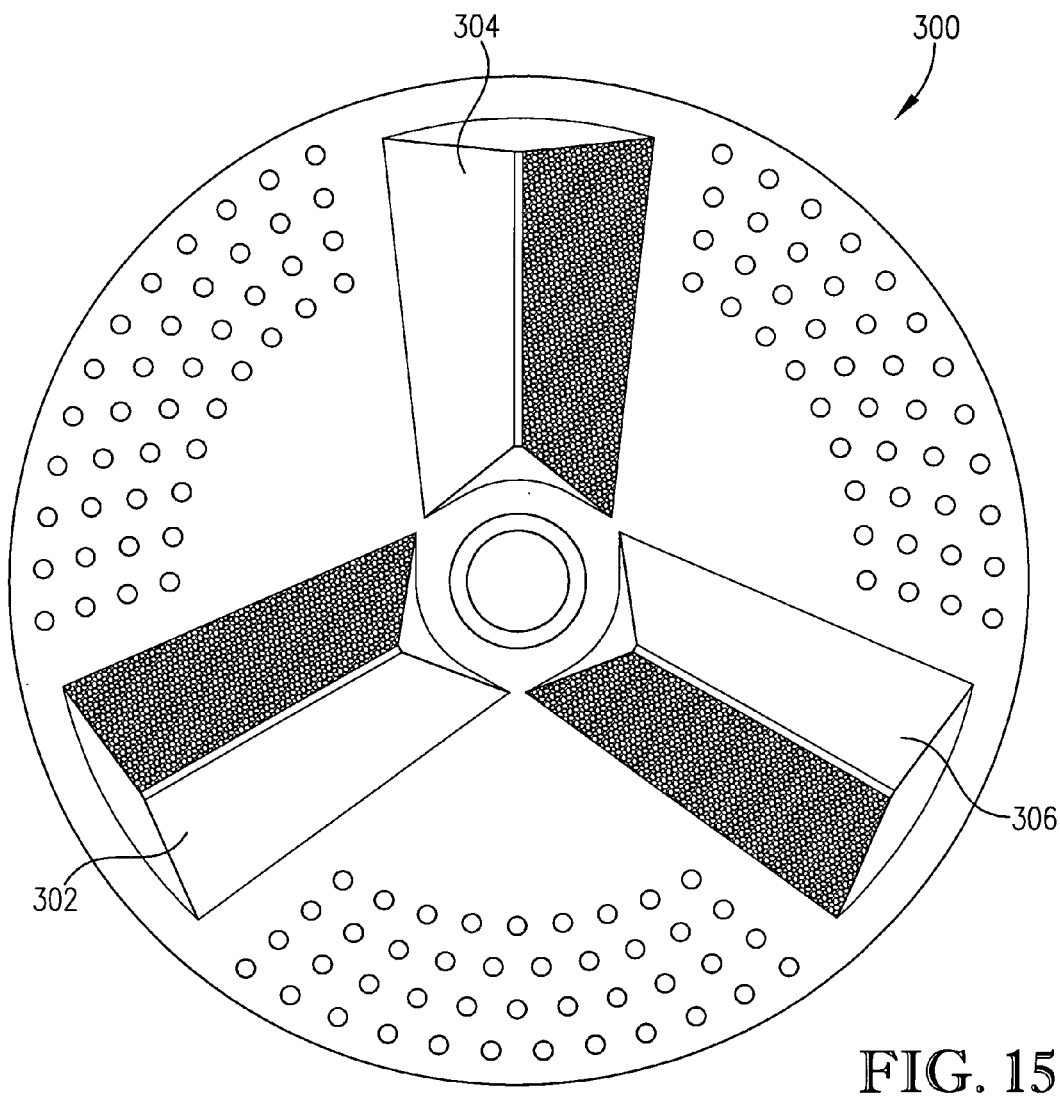
FIG. 15 is a plan view of the rotatable disc removed from the vessel of a tripe washing and refining apparatus constructed in accordance with a third preferred alternate embodiment.
Figure 16:
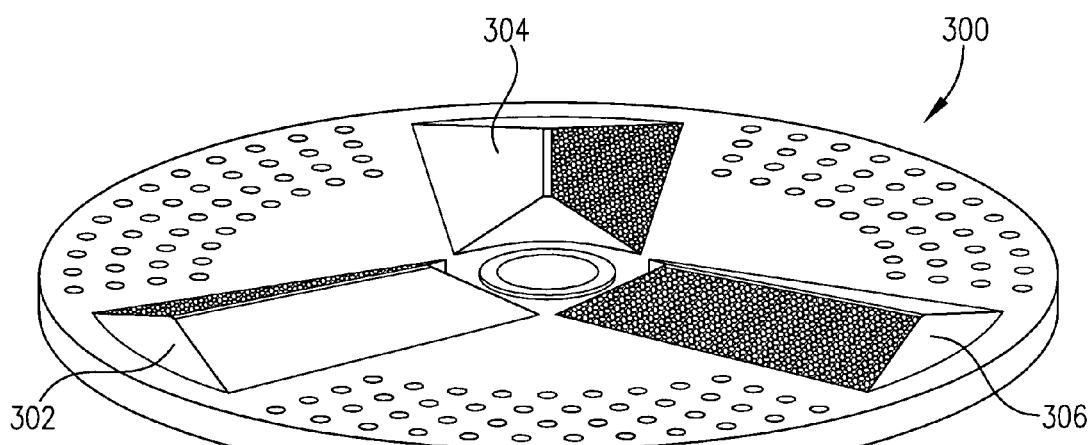
FIG. 16 is a perspective view of the disc illustrated in FIG. 15.

Yet another preferred alternative embodiment is the apparatus 300 illustrated in FIGS. 15–16. The apparatus 300 is similar in many respects to the apparatus 10 previously described in detail. However, the apparatus 300 includes disc projections 302,304,306 that extend substantially along the entire radius of the disc and project further into the inner chamber than the disc projections 40,42,44 of the apparatus 10. Additionally, the projections 302, 304, 306 are fixed to the disc so as not to be removable therefrom, such as integrally formed therewith.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A tripe cleaning apparatus adapted to wash and refine a quantity of tripe, the apparatus comprising:
    a vessel with a wall defining an inner chamber, wherein the chamber is adapted to contain the quantity of tripe,
    the vessel further including a washing fluid inlet pipe nozzle, a refining fluid inlet pipe nozzle, and a cold water inlet pipe nozzle, wherein each nozzle is adapted to connect the chamber with an external water source;
    a circular disc housed within the chamber and rotatable in a clockwise direction and in a counter-clockwise direction, the disc including an upper surface and a plurality of disc projections projecting from the upper surface,
    each of the disc projections presenting a radially oriented longitudinal axis, a substantially smooth washing surface, and a gritted refining surface,
    the washing surface sloping upward from the upper surface of the disc to the axis along the clockwise direction,
    the gritted refining surface longitudinally opposite the washing surface and sloping upward from the upper surface of the disc to the axis along the counter-clockwise direction;
    a motor connected to the disc for selectively rotating the disc in the clockwise direction and in the counter-clockwise direction;
    a switch connected to the motor and switchable between a first position, wherein the motor rotates the disc in the clockwise direction, and a second position, wherein the motor rotates the disc in the counter-clockwise direction;
    a plurality of baffles coupled to the wall of the vessel, spaced above the disc, and radially protruding inwardly from the wall,
    each of said baffles including a substantially smooth concave washing surface sloping away from the inner wall along the counter-clockwise direction, and a gritted concave refining surface longitudinally opposite the washing surface sloping away from the wall along the clockwise direction.

2. The apparatus as set forth in claim 1, the disc projections being removably connected to the upper surface of the disc.

3. The apparatus as set forth in claim 1, the baffles radially protruding inwardly and downwardly from the wall.

* * * * *